(12) United States Patent
Ramsayer

(10) Patent No.: US 8,546,725 B2
(45) Date of Patent: Oct. 1, 2013

(54) LASER BEAM MACHINING DEVICE AND METHOD FOR ADJUSTING THE FOCAL POSITION

(75) Inventor: Reiner Ramsayer, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 676 days.

(21) Appl. No.: 12/308,608

(22) PCT Filed: Dec. 3, 2007

(86) PCT No.: PCT/EP2007/063167
§ 371 (c)(1),
(2), (4) Date: Aug. 30, 2010

(87) PCT Pub. No.: WO2008/080728
PCT Pub. Date: Jul. 10, 2008

(65) Prior Publication Data
US 2010/0320177 A1    Dec. 23, 2010

(30) Foreign Application Priority Data

Dec. 27, 2006 (DE) .......................... 10 2006 061 622
Jul. 30, 2007 (DE) .......................... 10 2007 035 715

(51) Int. Cl.
*B23K 26/06* (2006.01)
(52) U.S. Cl.
USPC .................................................. 219/121.75
(58) Field of Classification Search
USPC .................................................. 219/121.75
See application file for complete search history.

(56) References Cited

U.S. PATENT DOCUMENTS

| | | | | |
|---|---|---|---|---|
| 5,354,323 A | * | 10/1994 | Whitebook | ...................... 607/89 |
| 5,793,489 A | * | 8/1998 | Kotidis et al. | .................. 356/502 |
| 6,123,719 A | * | 9/2000 | Masychev | ...................... 600/407 |
| 6,285,002 B1 | | 9/2001 | Ngoi et al. | |
| 6,399,915 B1 | * | 6/2002 | Mori et al. | ............... 219/121.83 |
| 6,485,599 B1 | * | 11/2002 | Glownia et al. | ............ 156/272.8 |
| 6,781,103 B1 | * | 8/2004 | Lane et al. | .................. 250/201.4 |
| 7,419,563 B2 | * | 9/2008 | Holman et al. | ............. 156/272.2 |
| 2002/0015148 A1 | * | 2/2002 | Tomomatsu | ................. 356/237.2 |
| 2002/0153500 A1 | | 10/2002 | Fordahl et al. | |
| 2003/0141002 A1 | | 7/2003 | Flanagan | |

FOREIGN PATENT DOCUMENTS

| | | |
|---|---|---|
| DE | 102 54 847 | 2/2004 |
| EP | 1 508 397 | 2/2005 |
| GB | 1 206 668 | 9/1970 |
| JP | 57 001594 | 1/1982 |
| JP | 2000-176667 | 6/2000 |
| JP | 2003-103386 | 4/2003 |
| JP | 2004 066281 | 3/2004 |
| JP | 2004-66281 | 3/2004 |
| JP | 2004-98163 | 4/2004 |
| JP | 2005-515916 | 6/2005 |

OTHER PUBLICATIONS

Database WIP Week 200426 Derwent Publications Ltd. London, GB; AN 2004-273937.

* cited by examiner

*Primary Examiner* — William D Coleman
(74) *Attorney, Agent, or Firm* — Kenyon & Kenyon LLP

(57) ABSTRACT

A laser beam machining device includes at least one laser beam source for acting upon at least one workpiece using an annular laser focus. Means are provided for imaging the laser radiation reflected from the workpiece on a sensor unit. A method for adjusting the focal position of an annular laser focus in relation to at least one workpiece is also provided.

22 Claims, 2 Drawing Sheets

LASER BEAM MACHINING DEVICE AND METHOD FOR ADJUSTING THE FOCAL POSITION

BACKGROUND INFORMATION

Laser beam machining devices for so-called axial ring welding or ring hardening are described in German Patent No. DE 10 254 847 and European Patent No. EP 1 508 397. The known laser beam machining devices are characterized in that an annular laser focus lying in a plane is producible with the aid of special optics.

In addition, laser beam machining devices for so-called peripheral ring welding or ring annealing exist, a laser focus extending along the circumference of at least one workpiece being producible using these laser beam machining devices. In particular in laser beam machining devices for producing a peripheral laser focus, adjusting the focal position is problematic, in particular because depending on the design of the laser beam machining device, the laser focus is not externally visible on the at least one workpiece, in particular on the joining point in the contact area of two workpieces. However, in order not to negatively influence the laser beam machining process, it must be ensured that the workpiece to be machined is positioned exactly at the laser focus and does not have any angular error. In the event of inexact positioning, an uneven intensity distribution of the laser focus results, which has a disadvantageous effect on the laser beam machining process and the machining result.

SUMMARY OF THE INVENTION

The present invention is therefore based on an object of refining a laser beam machining device in such a way that the adjustment of the focal position on the at least one workpiece is made easier. Furthermore, an object on which the present invention is based includes suggesting a corresponding optimized method for adjusting the focal position for an annular laser focus.

The present invention is based on the idea of imaging the laser radiation reflected from the at least one workpiece, i.e., the annular laser light spot on the workpiece in particular, on a sensor unit, to thus be able to make a statement about the location of the annular laser focus in relation to the at least one workpiece and as a result to adjust the laser focus in relation to the at least one workpiece manually or, as will be explained later, automatically, in particular by actively influencing the laser beam path and/or by actively adjusting the at least one workpiece. If the position of the laser focus deviates from the optimal position, in which a uniform intensity distribution preferably prevails, this is recognizable by analyzing the image, for example, in that the image of the particularly annular laser light spot is fuzzy, the absolute position of the image of the laser light spot is shifted, and/or the width, i.e., the radial extension of the annular laser light spot, is greater than in the optimum focal position. The laser beam and/or the workpiece position may be readjusted until the sharpness of the image and/or the absolute position of the image and/or the width of the image and/or the intensity of the image and thus of the actual laser focus on the workpiece is optimized. By providing at least one sensor unit, directly observing the laser focus on the workpiece may be dispensed with.

The laser beam machining device according to the present invention and the adjustment method according to the present invention are suitable in particular for laser beam machining devices, using which an annular, for example, circularly annular laser focus is producible on the circumference of at least one workpiece, for example, to weld two workpieces to one another or to thermally anneal at least one workpiece. In addition, the use of a sensor unit for detecting the image of the laser focus is also usable with laser beam machining devices which are implemented to produce an annular laser beam focus situated in a plane. The laser focus is preferably adjusted in relation to the workpiece in such a way that the intensity distribution within the annular laser focus on the workpiece (and thus also in the image on the sensor unit) is at least approximately constant, to thus ensure uniform heating of the at least one workpiece in the area of the annular, i.e., peripherally closed focus. A laser beam machining device implemented according to the concept of the present invention may be implemented for welding, annealing, tempering, etc., of workpieces.

In a refinement of the present invention, it is advantageously provided that the means for imaging the reflected laser radiation on a sensor unit include a beam splitter, which deflects the laser radiation reflected from the at least one workpiece as an observation beam path in the direction toward the sensor unit. The entire area of the annular laser light spot on the workpiece is preferably imaged on the sensor unit.

A specific embodiment in which an axicon is provided in the observation beam path, via which the annular laser focus is projectable on the sensor unit plane, is particularly advantageous. An axicon is preferably concurrently provided in the actual laser beam path between the at least one laser beam source and the at least one workpiece to produce an annular observation laser beam, this annular laser beam, in particular after passing through a focusing optical system, preferably being deflected by a conical mirror radially inward or radially outward onto the external or internal circumference of at least one workpiece.

To minimize external light influences, a specific embodiment is advantageous in which at least one optical filter for the laser wavelength, such as a band pass filter, a neutral density filter, etc., is provided within the observation beam path.

In particular to avoid damage to the sensor unit by imaging an annular laser focus having too high an intensity, in a refinement of the present invention, the location of the laser focus or the adjustment of the position of the laser focus in relation to the at least one workpiece is to be performed using a pilot laser beam whose intensity is preferably less than that of the actual machining laser beam. The pilot laser beam is to be parameterized in such a way that it may be reflected from the workpiece and imaged on the sensor unit, but does not melt the workpiece. It is important that the focal position of the pilot laser beam corresponds to the focal position of the machining laser beam; the pilot laser beam therefore preferably at least partially travels the same optical path as the actual machining laser beam.

A specific embodiment in which the pilot laser beam is producible by the same laser beam source which is also provided for producing the machining laser beam is preferred. Alternatively, it is conceivable to provide a pilot laser beam source in addition to the machining laser beam source, the pilot laser beam having to be injected suitably into the optical system of the machining laser beam.

A specific embodiment in which the sensor unit includes at least one, preferably multiple photodiodes is particularly advantageous, the at least one photodiode preferably being designed for the IR radiation spectrum. The adjustment of the laser beam focus is preferably performed in such a way that the annular, reflected laser beam has a uniform intensity. The sensor unit is preferably formed by multiple photodiodes, so that the position deviation of the workpiece or the laser beam focus may be ascertained from the individual signals (photocurrents) of the photodiodes. A four-quadrant photodiode is preferably provided, in which the mispositioning may be inferred via a simple analysis. In the event of mispositioning of the laser focus or the workpiece, the actual intensity distribution deviates from an optimum uniform intensity distribution, because of which the different photodiodes output photocurrents of different magnitudes. The dimension, i.e., the radial extension of the image of the laser radiation reflected from the workpiece, is enlarged concurrently because of the defocusing. It is also conceivable to provide a digital camera (for example, CCD, CMOS, etc.) as the sensor unit, the photodiodes of the digital camera being able to be implemented to operate in the IR radiation range or in the visible radiation range. The image is preferably analyzed using suitable image machining software on the basis of a brightness distribution of the image and/or on the basis of the sharpness of the image or the radial extension of the laser beam ring.

In particular for the case in which a digital camera is used as the sensor unit, the imaging result may be optimized using a suitable additional illumination, for example, coaxially through the optical system or by an illumination situated externally to the optical system.

A specific embodiment in which the adjustment of the focal position is not performed manually, but rather using an adjustment unit which sets the relative position between the laser focus and the workpiece as a function of the measured data acquired by the sensor unit, is particularly preferred. The adjustment unit is preferably implemented as a regulating unit and preferably sets an at least approximately uniform intensity distribution of the laser radiation on the at least one workpiece as a function of the actual state ascertained by the sensor unit. The adjustment unit preferably changes the workpiece position for this purpose, for example, the angular position and/or the position of the workpiece in an axial and/or radial direction. A rotationally symmetric workpiece is preferably positioned in such a way that the axis of rotation is coincident with the optical axis of the laser beam machining device. It is also conceivable to adjust the machining beam path. The adjustment of the focal position may be performed in multiple steps, for example, in such a way that the focal position is measured using a first preliminary laser pulse and the focal position is then changed using the adjustment unit as a function of this measured value, after which another measurement is performed, in particular using a further preliminary laser pulse, and the focal position is changed once again if needed, etc.

The present invention also provides a method for adjusting the focal position of an annular laser focus in relation to at least one workpiece, according to the present invention, the laser radiation reflected from the workpiece being imaged on a sensor unit and the focal position being displayed, for example, by changing the laser beam path and/or by changing the position of the workpiece, as a function of the measuring data of the sensor unit, in particular as a function of the photocurrents of photodiodes of the sensor unit. The adjustment of the focal position is preferably performed automatically as a regulating procedure.

DETAILED DESCRIPTION

Figure 1:
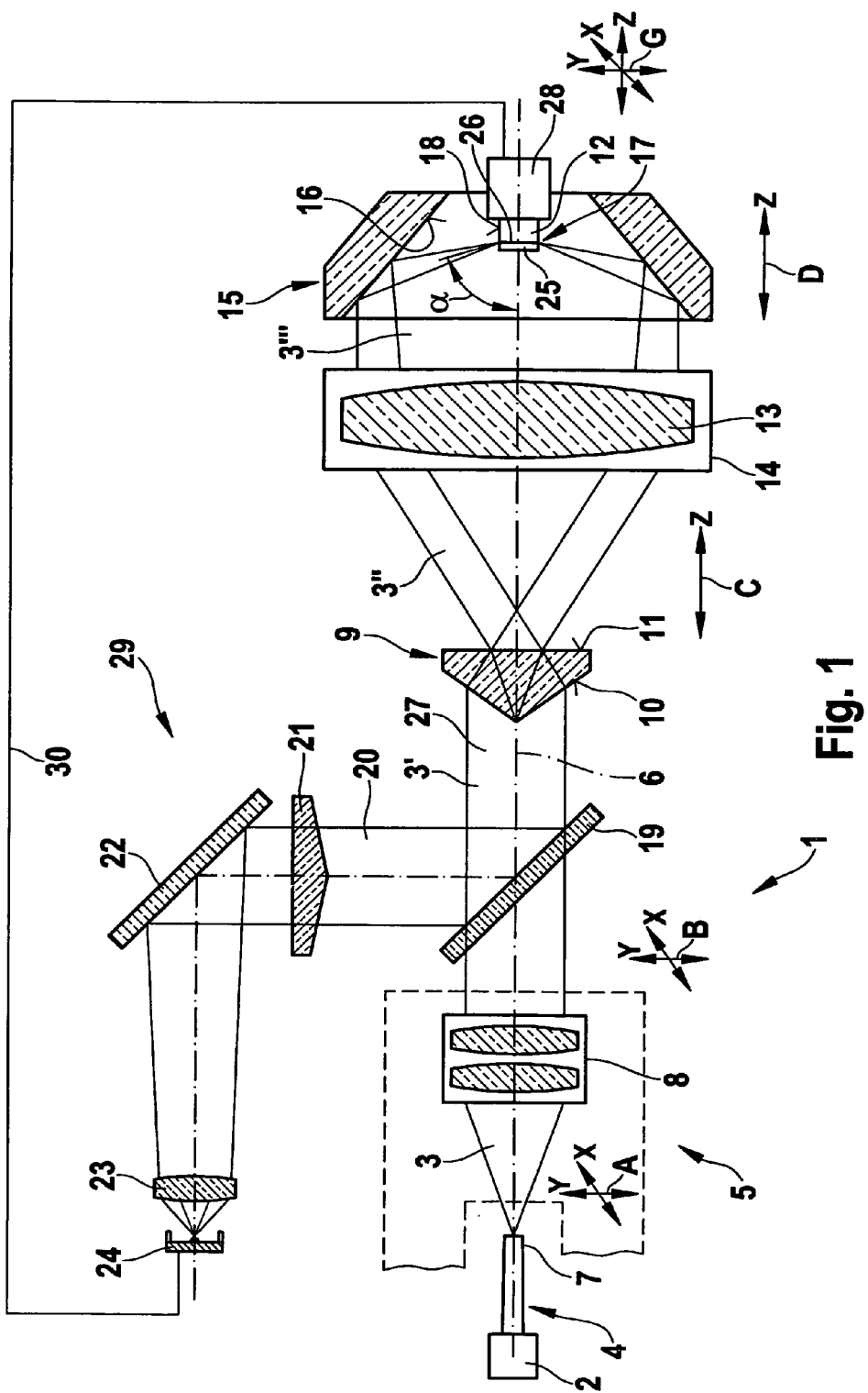
FIG. 1 shows a schematic illustration of the construction of a laser beam machining device having a sensor unit on which laser radiation reflected from a workpiece is imaged.

FIG. 1 shows a laser beam machining device 1 for annealing or welding workpieces 12, 25. The laser beam machining device has a laser beam source 2, which produces a pulsed laser beam 3 having a circular cross-sectional area. Laser beam 3 is fed via an optical fiber 4 into an optic unit 5 along an optical axis 6 (Z axis). Discharge area 7 of optical fiber 4 is adjustable vertically and horizontally (along a Y axis and an X axis) to optical axis 6 (arrow directions A). Laser beam 3, i.e., laser beam path 27, may thus be centered.

Expanded laser beam 3 is incident on a collimator 8, situated at a distance from outlet area 7 of optical fiber 4 in laser beam path 27, of optical unit 5, which parallelizes the laser beam. Collimator 8 may be adjusted vertically and horizontally along the Y axis and the X axis (arrow directions B) to optical axis 6 (Z axis), so that a uniform distribution of the intensity of parallelized laser beam 3' may be achieved. Parallelized laser beam 3' is incident on an axicon 9, situated at a distance in the axial direction from collimator 8 in laser beam path 27, having a conical incidence area 10 and a planar emission area 11 situated transversely to laser beam path 27.

Axicon 9 may be adjusted in the axial direction along optical axis 6 (arrow directions C), so that an angle of incidence α, which is to be explained later, on two workpieces 12, 25 (main body and cover) which are adjacent in the axial direction, are adjustable in all spatial directions and may be oriented angularly by adjustment unit 28, which is to be explained later, may be varied.

Using axicon 9, laser beam 3', oriented in parallel and having a circular cross-sectional area, is converted into a laser beam 3'' having a circularly annular cross-sectional area which radiates through a focusing unit 14 containing a focusing objective 13 and is axially incident on a conical mirror 15, adjustable in the axial direction in arrow directions D, in laser beam path 27 having an internal mirror area 16. Conical mirror 15 deflects annular laser beam 3''' radially inward at an angle α to optical axis 6 onto a lateral joining zone 17 in the area of lateral surface 18 of workpieces 12, 25. Cylindrical workpieces 12, 25 and focusing unit 14 are situated at a distance from one another in such a way that annular laser beam 3''' is focused on lateral joining zone 17 of workpieces 12, 25. The diameter of produced laser beam focus 26 may be varied by displacing conical mirror 15 along optical axis 6. Angle of incidence α of laser beam 3''' on workpieces 12, 25 in relation to optical axis 6 and/or to the axis of symmetry of workpieces 12, 25 may be set by the selection of the cone angle. A uniform symmetrical peripheral weld seam is obtained using the laser beam, i.e., laser focus acting simultaneously on entire joining zone 17.

Instead of conical mirror 15 having internal mirror surface 16, a conical mirror (not shown) having an external conical surface may also be used. It is preferably moved into workpieces 12, 25, so that laser beam 3''' is not deflected radially inward as shown, but rather radially outward to the internal circumference of workpieces 12, 25.

Laser beam machining device 1 includes means 29 for imaging the laser radiation reflected from workpieces 12, 25 on a sensor unit 24. This sensor unit 24 is connected via a data cable 30 to conduct signals to adjustment unit 28. Adjustment unit 28 is used for orienting workpieces 12, 25 in relation to laser focus 26 and thus to even out the intensity of laser beam 3' in joining zone 17 in the contact area of adjacent workpieces 12, 25.

Means 29 for imaging the laser radiation reflected from workpieces 12, 25 on sensor unit 24 include a beam splitter 19 situated in laser beam path 27. With the aid of beam splitter 19, the laser radiation reflected from workpieces 12, 25, which is reflected back on conical mirror 15 and radiates back from there through focusing unit 14 and axicon 9, is extracted from laser beam path 27 as observation beam path 20. An axicon 21 is situated in observation beam path 20, to produce an annular laser beam which is deflected by 90° on a mirror 22 and is focused using a focusing lens 23 on sensor unit 24. The image of the laser light spot in joining zone 17 is thus projected on sensor unit 24, which is implemented in the exemplary embodiment shown as a four-quadrant photodiode. For example, if the axis of symmetry of rotationally symmetric workpieces 12, 25 is not coincident with optical axis 6, an uneven intensity distribution results in joining zone 17, which has the result that the photodiodes of sensor unit 24 implemented as IR photodiodes measure different intensities and thus generate photocurrents of different magnitudes. These photocurrents or corresponding signals are transmitted via data cable 30 to adjustment unit 28, which positions workpieces 12, 25 on the basis of these measured data in such a way (arrow directions G) that the intensity distribution on the circumference of workpieces 12, 25 is at least approximately uniform, in the present case, the axis of symmetry of workpieces 12, 25 thus corresponding to optical axis 6. Additionally or alternatively, adjustment unit 28 may act to adjust the optical components in laser beam path 27. In particular for the case in which a digital camera is used as sensor unit 24, adjustment unit 28 or an analysis unit (not shown) of adjustment unit 28 may analyze the image data in regard to the sharpness of the image, the extension of the image in the radial direction, a brightness distribution, etc. The adjustment is preferably always performed using adjustment unit 28 in such a way that a uniform and/or desired intensity distribution results on workpieces 12, 25.

Figure 2A:
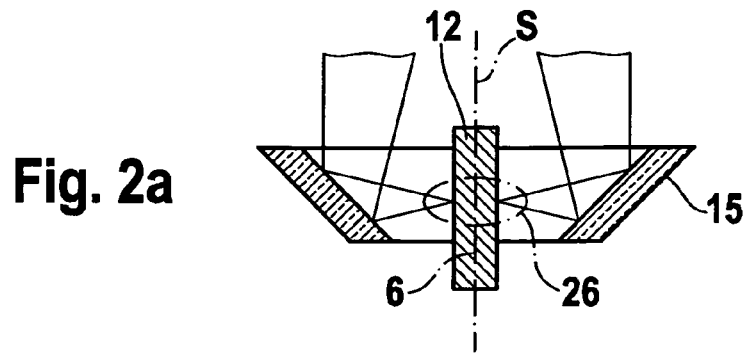
FIGS. 2a and 2b show a workpiece having an optimal focal position in a side view and a top view.
Figure 2B:
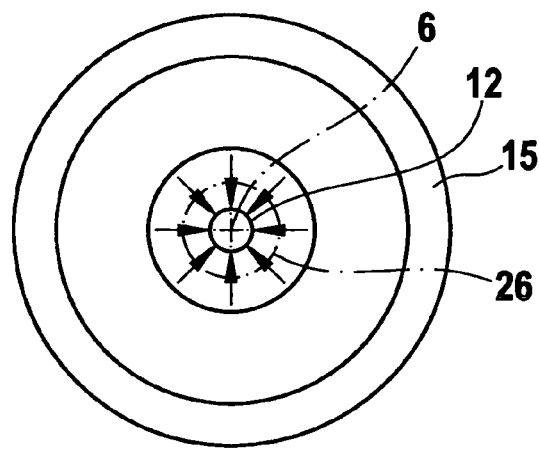

The case of an optimally positioned laser focus 26 on a rotationally symmetric workpiece 12 is shown in FIGS. 2*a* and 2*b*. It is apparent that an axis of symmetry S of workpiece 12 is coincident with optical axis 6. The intensity distribution of laser focus 26 is at least approximately constant around the circumference of workpiece 12.

Figure 3:
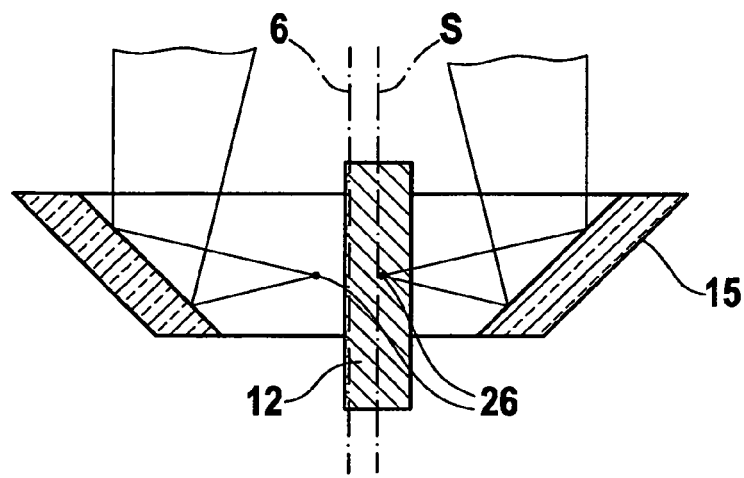
FIG. 3 shows a workpiece having a mispositioned focal position.

A shifted focal position is shown in FIG. 3. It is apparent that axis of symmetry S of workpiece 12 runs at a distance from optical axis 6. This results in an uneven intensity distribution around the circumference of workpiece 12, which has the result that the intensity of the laser radiation reflected from workpiece 12 or the intensity of the image on sensor unit 24 is uneven.

What is claimed is:

1. A laser beam machining device comprising:
at least one laser beam source producing a machining laser beam, acting upon at least one workpiece using an annular laser focus; and
means for imaging laser radiation reflected from the workpiece on a sensor unit that includes at least one photodiode.

2. The laser beam machining device according to claim 1, wherein the means for imaging includes a beam splitter situated in a laser beam path between the laser beam source and the workpiece, which is implemented and situated in such a way that the laser radiation reflected from the workpiece is extracted from the laser beam path as an observation beam path.

3. The laser beam machining device according to claim 1, further comprising means for producing a pilot laser beam, which is reflected from the workpiece, but does not melt it, the pilot laser beam being oriented in such a way that a focal position of the pilot laser beam corresponds to a focal position of the machining laser beam.

4. The laser beam machining device according to claim 1, wherein the sensor unit includes a plurality of photodiodes and is implemented as a four-quadrant photodiode or as a digital camera.

5. The laser beam machining device according to claim 2, further comprising an axicon is situated in the observation beam path.

6. The laser beam machining device according to claim 2, further comprising at least one optical filter situated in the observation beam path.

7. The laser beam machining device according to claim 3, wherein the laser beam source produces the pilot laser beam and the machining laser beam.

8. The laser beam machining device according to claim 4, further comprising an adjustment unit for adjusting a focal position in relation to the workpiece as a function of the measuring data acquired by the sensor unit, the adjustment unit being implemented to set an at least substantially uniform intensity distribution of the laser focus on the workpiece.

9. A method for adjusting a focal position of a machining laser beam having an annular laser focus in relation to at least one workpiece, comprising:
imaging laser radiation reflected from the workpiece on a sensor unit that includes at least one photodiode; and
adjusting the focal position of the machining laser beam having the annular laser focus as a function of measuring data of the sensor unit.

10. The method according to claim 9, wherein the focal position is adjusted automatically as a regulating method.

11. A laser beam machining device comprising:
at least one laser beam source producing a machining laser beam acting upon at least one workpiece using an annular laser focus;
means for imaging laser radiation reflected from the workpiece on a sensor unit including a beam splitter situated in a laser beam path between the laser beam source and the workpiece, which is implemented and situated in such a way that the laser radiation reflected from the workpiece is extracted from the laser beam path as an observation beam path; and
an axicon situated in the observation beam path.

12. A laser beam machining device comprising:
at least one laser beam source producing a machining laser beam acting upon at least one workpiece using an annular laser focus;
means for imaging laser radiation reflected from the workpiece on a sensor unit including a beam splitter situated in a laser beam path between the laser beam source and the workpiece, which is implemented and situated in such a way that the laser radiation reflected from the workpiece is extracted from the laser beam path as an observation beam path; and
at least one optical filter situated in the observation beam path.

13. A laser beam machining device comprising:
at least one laser beam source, for acting upon at least one workpiece using an annular laser focus;
means for imaging laser radiation reflected from the workpiece on a sensor unit; and means for producing a pilot laser beam, which is reflected from the workpiece, but does not melt it, the pilot laser beam being oriented in such a way that a focal position of the pilot laser beam corresponds to a focal position of the machining laser beam.

14. The laser beam machining device according to claim 13, wherein the laser beam source produces the pilot laser beam and the machining laser beam.

15. A laser beam machining device comprising:
   at least one laser beam source producing a machining laser beam acting upon at least one workpiece using an annular laser focus;
   a sensor unit including a plurality of photodiodes and implemented as a four-quadrant photodiode or as a digital camera; and
   means for imaging laser radiation reflected from the workpiece on the sensor unit.

16. The laser beam machining device according to claim 15, further comprising an adjustment unit for adjusting a focal position in relation to the workpiece as a function of the measuring data acquired by the sensor unit, the adjustment unit being implemented to set an at least substantially uniform intensity distribution of the laser focus on the workpiece.

17. A method for adjusting a focal position of a machining laser beam having an annular laser focus in relation to at least one workpiece, comprising:
   imaging laser radiation reflected from the workpiece on a sensor unit;
   extracting the laser radiation reflected from the workpiece as an observation beam path using a beam splitter;
   situating an axicon in the observation beam path; and
   adjusting the focal position of the machining laser beam as a function of measuring data of the sensor unit.

18. A method for adjusting a focal position of a machining laser beam having an annular laser focus in relation to at least one workpiece, comprising: imaging laser radiation reflected from the workpiece on a sensor unit;
extracting the laser radiation reflected from the workpiece as an observation beam path using a beam splitter;
situating at least one optical filter in the observation beam path; and
adjusting the focal position of the machining laser beam as a function of measuring data of the sensor unit.

19. A method for adjusting a focal position of an annular laser focus in relation to at least one workpiece, comprising:
   imaging laser radiation reflected from the workpiece on a sensor unit;
   producing a pilot laser beam reflected from the workpiece without melting the workpiece;
   orienting the pilot laser beam so a focal position of the pilot laser beam corresponds to the focal position of the annular laser focus of a machining laser beam; and
   adjusting the focal position of the annular laser focus of the machining laser beam as a function of measuring data of the sensor unit.

20. The method according to claim 19, further comprising producing the pilot laser beam and the machining laser beam from a laser beam source.

21. A method for adjusting a focal position of a machining laser beam having an annular laser focus in relation to at least one workpiece, comprising:
   imaging laser radiation reflected from the workpiece on a sensor unit including a plurality of photodiodes and implemented as a four-quadrant photodiode or as a digital camera; and
   adjusting the focal position of the machining laser beam as a function of measuring data of the sensor unit.

22. The method according to claim 21, further comprising setting an at least substantially uniform intensity distribution of the annular laser focus on the workpiece when adjusting the focal position in relation to the workpiece as the function of the measuring data acquired by the sensor unit.

* * * * *

UNITED STATES PATENT AND TRADEMARK OFFICE
CERTIFICATE OF CORRECTION

PATENT NO. : 8,546,725 B2 Page 1 of 1
APPLICATION NO. : 12/308608
DATED : October 1, 2013
INVENTOR(S) : Reiner Ramsayer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1105 days.

Signed and Sealed this

Fifteenth Day of September, 2015

Michelle K. Lee
*Director of the United States Patent and Trademark Office*